United States Patent
Hsieh

(10) Patent No.: US 7,219,396 B2
(45) Date of Patent: May 22, 2007

(54) BELT TIGHTENING DEVICE WITH DISPLAY FOR DISPLAYING TENSION

(76) Inventor: Chih-Ching Hsieh, 235 Chung-Ho Box 8-24, Taipei (TW)

( * ) Notice: Subject to any disclaimer, the term of this patent is extended or adjusted under 35 U.S.C. 154(b) by 29 days.

(21) Appl. No.: 11/151,579

(22) Filed: Jun. 14, 2005

(65) Prior Publication Data

US 2006/0277726 A1    Dec. 14, 2006

(51) Int. Cl.
B25B 25/00    (2006.01)
A44B 21/00    (2006.01)
(52) U.S. Cl. .................. 24/68 R; 24/68 CD; 254/213
(58) Field of Classification Search ............ 24/68 CD, 24/68 R, 68 CT; 254/256, 249, 248, 222, 254/223, 218, 217, 213
See application file for complete search history.

(56) References Cited

U.S. PATENT DOCUMENTS

| 942,006 | A | * | 11/1909 | Morehead | .................. 254/223 |
|---|---|---|---|---|---|
| 3,120,946 | A | * | 2/1964 | McCormack et al. | ..... 24/68 CD |
| 4,235,420 | A | * | 11/1980 | Ross et al. | ................... 254/218 |
| 5,738,637 | A | * | 4/1998 | Kelly et al. | .................... 601/41 |
| 6,908,073 | B1 | * | 6/2005 | Hsien | ......................... 254/218 |
| 7,093,327 | B2 | * | 8/2006 | Huang | ...................... 24/68 CD |
| 2004/0104380 | A1 | * | 6/2004 | Huang | ......................... 254/218 |
| 2005/0278902 | A1 | * | 12/2005 | Wilcox et al. | ........... 24/68 CD |

* cited by examiner

Primary Examiner—Robert J. Sandy

(57) ABSTRACT

A belt tightening device with a display comprises a body having a seat; one end of the seat being installed with one fixing hook; a pull rod pivotally installed to the seat; a wheel rotatably installed to the pull rod; a belt winding around the wheel; wherein when the pull rod is pulled so that wheel rotates with the pull rod; the belt will wind to tighten an object fixed by the fixing hook; a strain gauge installed at a connection between the fixing hook and the seat; an integrating unit installed at the seat and connected to the strain gauge; the integrating unit connected to the strain gauge will determine the tension of the fixing hook through the resistance; and a display installed in the integrating unit for displaying the tension determined by the integrating unit.

9 Claims, 4 Drawing Sheets

BELT TIGHTENING DEVICE WITH DISPLAY FOR DISPLAYING TENSION

FIELD OF THE INVENTION

The present invention relates to belt tightening devices, and in particular to a belt tightening device with a display, which can provide the tension value of the hook to the user so that the user can adjust the pull force to have a safe operation.

BACKGROUND OF THE INVENTION

The prior art belt tightening device has the following elements. A body has a seat. Two ends of the seat are installed with a fixing hook and a movable hook. The fixing hook and movably hook are used to hook two sides of an object to be tied. A pull rod is pivotally installed to the seat. A wheel is rotatably installed to the pull rod. Two lateral sides of the wheel are installed with two stop claws. A belt winds around the wheel. In operation, the fixing hook and movably hook hook two sides of an object and then the pull rod is pulled so that wheel rotates with the pull rod to wind the belt so that the movably hook is tightened. When the pull rod is pushed back to the original position, since the pull rod has two stop claws, the wheel will not loose the belt. If the pull rod is pulled and release repeatedly, the belt will be tightened.

However if the tension is too great, the belt will break, but the prior art can be indicated the tension to the user so that the user cannot adjust the pull force to a proper value. Thereby there is an eager demand for a novel design which can improve the prior art defect.

SUMMARY OF THE INVENTION

Accordingly, the primary object of the present invention is to provide a belt tightening device with a display, which can provide the tension value of the hook to the user so that the user can adjust the pull force to have a safe operation.

To achieve above objects, the present invention provides A belt tightening device with a display which comprises a body having a seat; one end of the seat being installed with one fixing hook; a pull rod pivotally installed to the seat; a wheel rotatably installed to the pull rod; a belt winding around the wheel; wherein when the pull rod is pulled so that wheel rotates with the pull rod; the belt will wind the wheel further to tighten an object fixed by the fixing hook; a strain gauge installed at a connection between the fixing hook and the seat; an integrating unit installed at the seat and connected to the strain gauge; the integrating unit connected to the strain gauge will determine the tension of the fixing hook through the resistance; and a display installed in the integrating unit for displaying the tension determined by the integrating unit.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
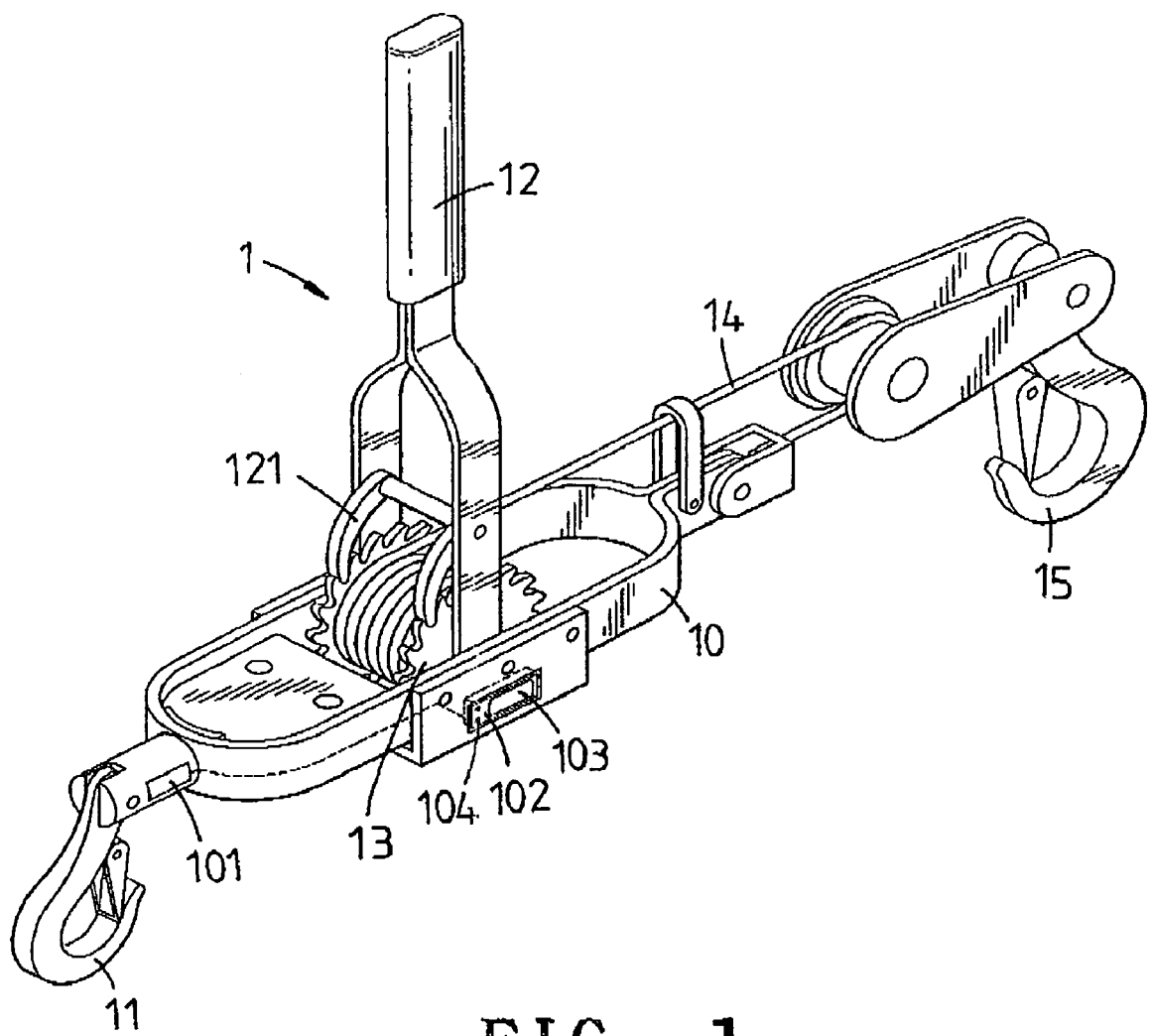
FIG. 1 is a perspective view of the first embodiment of the present invention.

With reference to FIG. 1, the belt tightening device is illustrated. The belt tightening device has the following elements.

A body 1 has a seat 10. Two ends of the seat 10 are installed with one fixing hook 11 and a movable hook 15. The fixing hook 11 and movably hook 15 are used to hook two sides of an object to be tied.

A pull rod 12 is pivotally installed to the seat 10.

A wheel 13 is rotatably installed to the pull rod 12. Two lateral sides of the wheel 13 are installed with two stop claws 121. A belt 14 winds around the wheel 13.

In operation, the fixing hook 11 and movably hook 15 hook two sides of an object and then the pull rod 12 is pulled so that wheel 13 rotates with the pull rod 12 so as to wind the belt 14, and thus the belt is tightened. When the pull rod 12 is pushed back to the original position, since the pull rod 12 has two stop claws 121, the wheel will not loose the belt 14. If the pull rod 12 is pulled and released repeatedly, the belt 14 will be tightened. However above mentioned structure is used in the prior art and thus is not the novel feature of the present invention. The feature of the present invention will be described herein.

A strain gauge 101 is installed at a connection between the fixing hook 11 and the seat 10. The seat 10 has an integrating unit 102 connected to the strain gauge 101. The integrating unit 102 includes at least one battery (not shown) as a power supply, a display 103 and an adjusting button 104. When the fixing hook 11 and movably hook 15 hook an object and the body 1 is tightened, the strain gauge 101 will deform due to the tension of the belt 14 so that the resistance also changes. The integrating unit 102 connected to the strain gauge 101 will determine the tension of the fixing hook 11 through the resistance. The value of the tension will be described on the display 103. Similarly, the tension of the movably hook 15 can also be displayed on the display 103 by the same mechanism. Thus the user can adjust the tension to be desired value. The adjusting button 104 serves to switch the device to be displayed or the display unit to be displayed.

Figure 2:
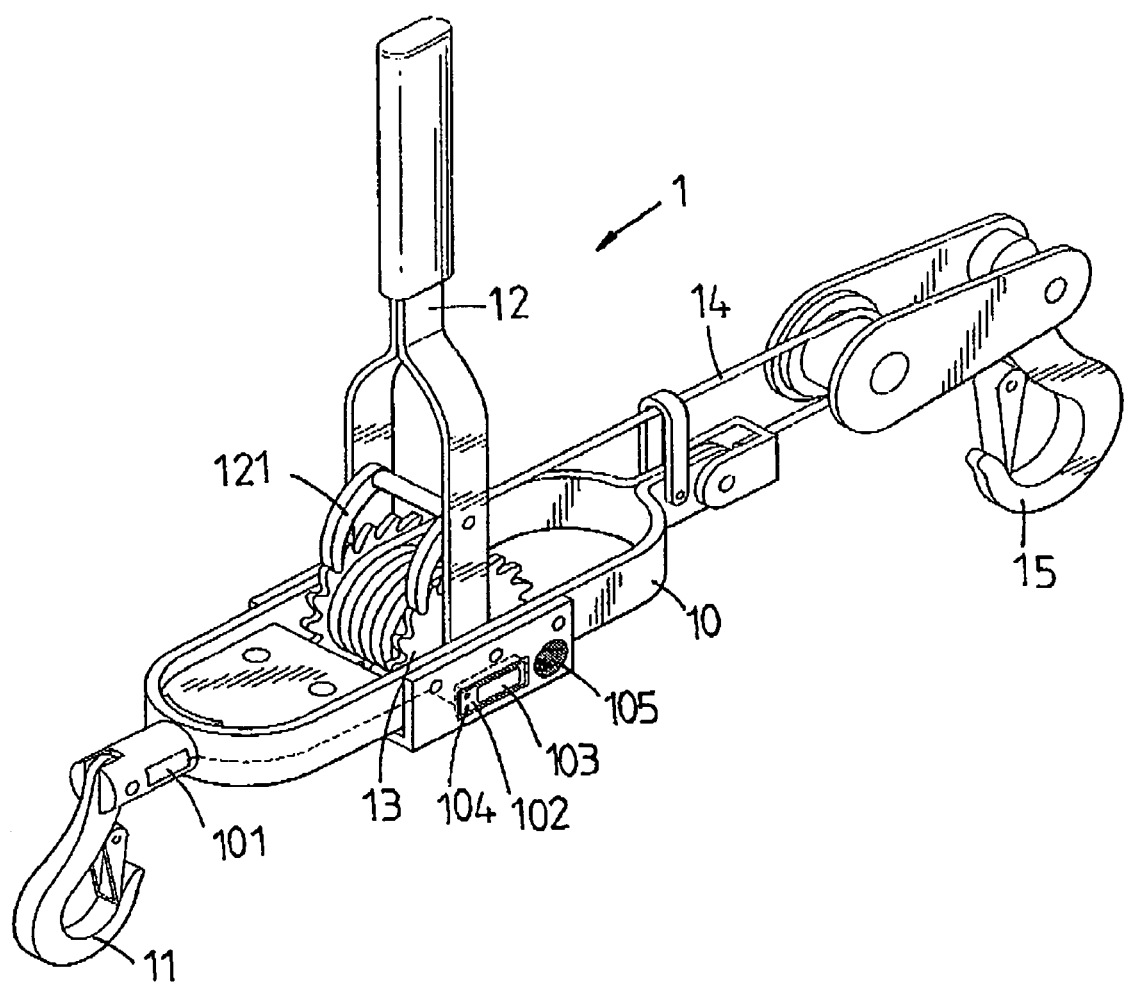
FIG. 2 is a perspective view of the second embodiment of the present invention.

With reference to FIG. 2, the second embodiment of the display device of a belt tightening device of the present invention will be described herein. Those identical to the first embodiment will not be described herein. Only the difference of the two is described herein. A buzzer 105 is installed at the seat 10. The buzzer 105 is controlled by the integrating unit 102 and the adjusting button 104 serves to set a threshold. When the tension is over the threshold, buzz sounds will emit to alert the user so as to avoid the belt 14 is too tight.

Figure 3:
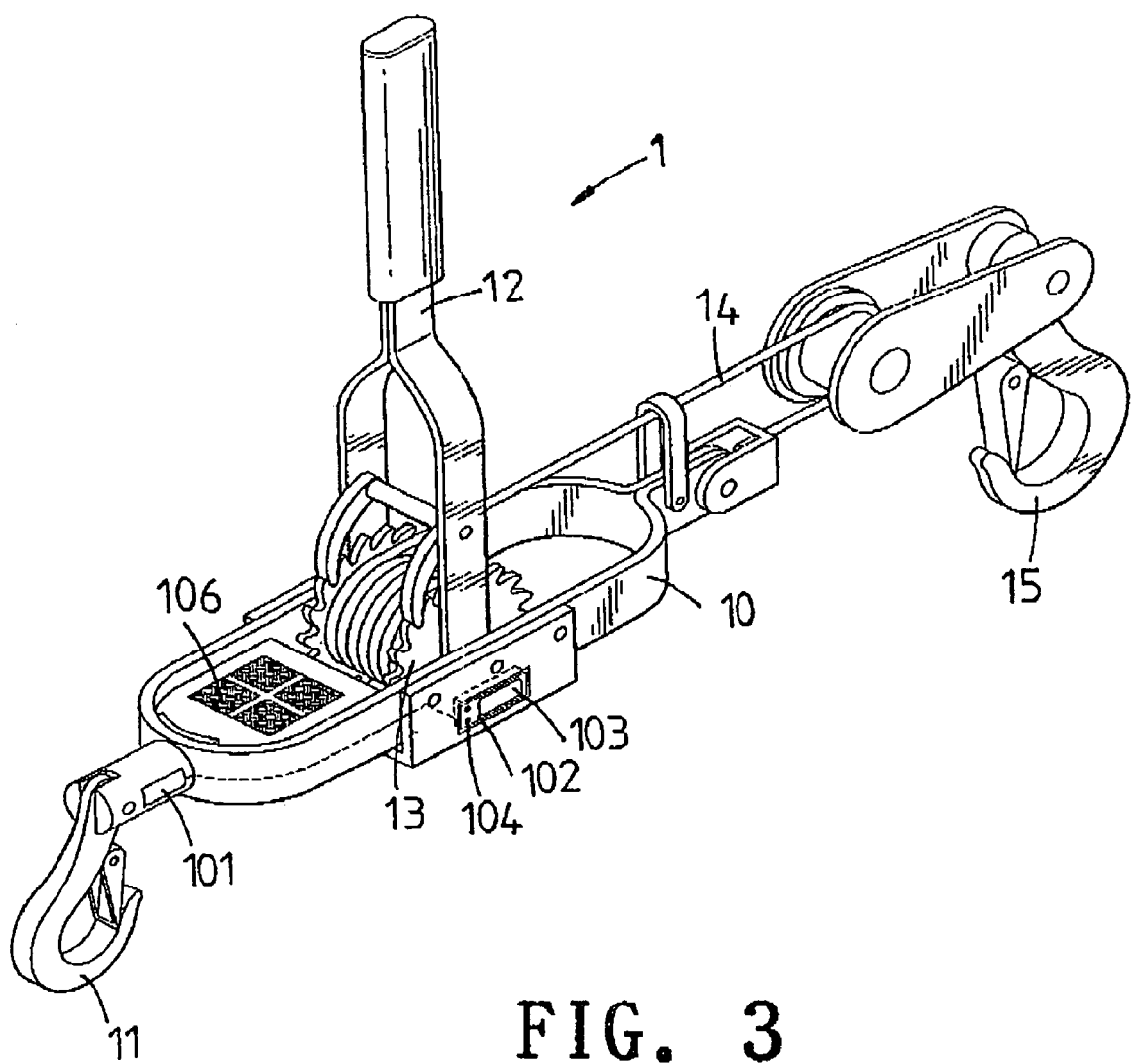
FIG. 3 is a perspective view of the third embodiment of the present invention.

Referring to FIG. 3, the third embodiment of the display device of a belt tightening device of the present invention will be described herein. Those identical to the first embodiment will not be described herein. Only the difference of the two is described herein. A solar energy plate 106 is installed on the seat 10 for absorbing light energy and converting light energy into electric energy so as to supply power to the integrating unit 102. Thus the battery power is saved.

Figure 4:
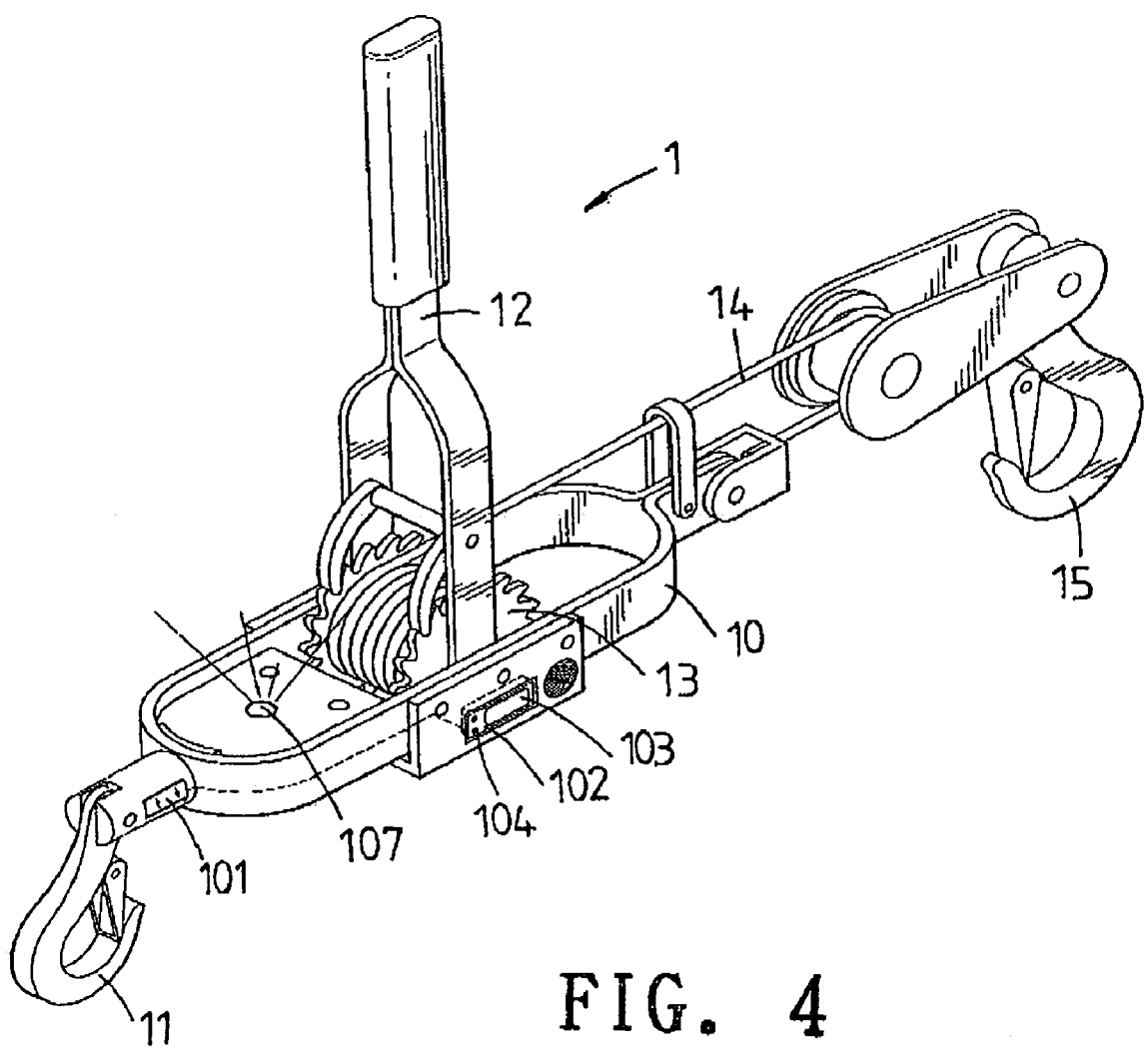
FIG. 4 is a perspective view of the fourth embodiment of the present invention.

Referring to FIG. 4, the fourth embodiment of the display device of a belt tightening device of the present invention will be described herein. Those identical to the first embodiment will not be described herein. Only the difference of the two is described herein. It is illustrated that a lamp 107 is installed to the seat 10. The lamp 107 is turned on or off by the lamp.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A belt tightening device with a display comprising:
    a body having a seat; one end of the seat being installed with one fixing hook;
    a pull rod pivotally installed to the seat;
    a wheel rotatably installed to the pull rod; a belt winding around the wheel; wherein when the pull rod is pulled so that wheel rotates with the pull rod; the belt will be wound to tighten an object fixed by the fixing hook;
    a strain gauge installed at a connection between the fixing hook and the seat;
    an integrating unit installed at the seat and connected to the strain gauge; wherein when the fixing hook is tightened, the strain gauge will deform due to the tension of the belt so that the resistance also changes; the integrating unit connected to the strain gauge will determine the tension of the fixing hook through the resistance; and
    a display installed in the integrating unit for displaying the tension determined by the integrating unit; and
    wherein the integrating unit includes a display and a push button; and
    wherein the integrating unit further includes at least one battery as a power supply.

2. The belt tightening device with a display as claimed in claim 1, wherein the seat is installed with a buzzer for alerting the user as the tension is over a threshold.

3. The belt tightening device with a display as claimed in claim 1, wherein the seat is installed with a lamp for illumination in operation.

4. The belt tightening device with a display as claimed in claim 1, wherein the seat is installed with a solar energy plate as a power supply.

5. A belt tightening device with a display comprising:
    a body having a seat; two ends of the seat being installed with one fixing hook and a moveable hook; the fixing hook and movably hook being used to hook an object to be tied;
    a pull rod pivotally installed to the seat;
    a wheel rotatably installed to the pull rod and two lateral sides of the wheel being installed with two stop claws; a belt winding around the wheel; wherein in operation, when the pull rod is pulled so that the wheel rotates with the pull rod to wind the belt, the belt is tightened; and
    a strain gauge is installed at a connection between the fixing hook and the seat; the seat having an integrating unit connected to the strain gauge; the integrating unit being installed with at least one battery as a power supply;
    a display installed in the integrating unit for displaying the tension determined by the integrating unit.

6. The belt tightening device with a display as claimed in claim 5, wherein the seat is installed with a buzzer for alerting the user as the tension is over a threshold.

7. The belt tightening device with a display as claimed in claim 5, wherein the seat is installed with a lamp for illumination in operation.

8. The belt tightening device with a display as claimed in claim 5, wherein the seat is installed with a solar energy plate as power supply.

9. The belt tightening device with a display as claimed in claim 5, wherein the strain gauge is made of piezoelectric material.

* * * * *